(12) United States Patent
Shabtay et al.

(10) Patent No.: US 6,895,441 B1
(45) Date of Patent: May 17, 2005

(54) PATH REROUTING MECHANISM UTILIZING MULTIPLE LINK BANDWIDTH ALLOCATIONS

(75) Inventors: Lior Shabtay, Ganai Tikva (IL); Yoram Shamir, Kriat Ono (IL); Leonid Shmulevich, Rechovot (IL); Ofir Friedman, Rishon Letzion (IL); Yaron Raz, Ramot Meir (IL); Zacky Pickholz, Tel Aviv (IL)

(73) Assignee: Atrica Ireland Ltd., Dublin (IE)

( * ) Notice: Subject to any disclaimer, the term of this patent is extended or adjusted under 35 U.S.C. 154(b) by 677 days.

(21) Appl. No.: 09/918,278

(22) Filed: Jul. 30, 2001

(51) Int. Cl.[7] .............................................. G06F 15/173
(52) U.S. Cl. ........................ 709/238; 709/239; 370/227; 370/351; 340/2.1; 340/2.23; 340/825.01
(58) Field of Search ................................. 709/238, 239; 370/227, 228, 242, 351, 362; 340/2.1, 2.23, 825.01; 714/2, 4

(56) References Cited

U.S. PATENT DOCUMENTS

| | | | |
|---|---|---|---|
| 5,590,118 A | 12/1996 | Nederlof | ..................... 370/218 |
| 5,856,981 A | 1/1999 | Voelker | ..................... 371/20.1 |
| 6,496,476 B1 * | 12/2002 | Badt et al. | .................. 370/228 |
| 6,507,561 B1 * | 1/2003 | Baniewicz et al. | ......... 370/216 |
| 6,512,740 B1 * | 1/2003 | Baniewicz et al. | ......... 370/216 |
| 2002/0141334 A1 * | 10/2002 | Deboer et al. | ............. 370/227 |

OTHER PUBLICATIONS

Internet Engineering Task Force Draft, "draft-gan-fast-reroute-00.txt." "A Method for MPLS LSP Fast Reroute Using RSVP Detours", Apr. 2001.

Internet Engineering Task Force Draft, "draft-chang-mpls-rsvp-path-protection-ext-01.text," "Extensions to RSVP-TE for MPLS Path Protection", Nov. 2000.

Internet Engineering Task Force Draft, "draft-swallow-rsvp-bypass-label-01.txt," "RSVP Label Allocation for Backup Tunnels", Nov. 2000.

Internet Engineering Task Force Draft, "draft-iwata-mpls-shared-fastreroute-00.txt," "MPLS Signaling Extensions for Shared Fast Rerouting", Jul. 2001.

Internet Engineering Task Force Draft, "draft-kini-restoration-shared-backup-01.txt," "Shared Backup Label Switched Path Restoration", May 2001.

Internet Engineering Task Force Draft, "draft-kini-isis-lsp-restoration-00.txt," "Intermediate System to Intermediate System (IS-IS) Protocol Extensions for Label Switched Path Restoration", Nov. 2000.

(Continued)

Primary Examiner—Frantz B. Jean
(74) Attorney, Agent, or Firm—Zaretsky & Associates PC; Howard Zaretsky (57) ABSTRACT

A path reroute mechanism for use in communication networks comprising multiple searches for a routing path to restore traffic following a failure that could not be protected by a previously established protection route (i.e. protection tunnel, bypass, etc.) or for routing or rerouting of traffic paths for optimization or any other purpose. Each node advertises TLVs that include bandwidth allocation information used to derive the actual amount of bandwidth available for protection purposes, protected paths and unprotected paths or a portion of this information such as in the case where unprotected paths are not supported. Searches are performed on larger and larger portions of the available bandwidth until a route for the path is found.

54 Claims, 5 Drawing Sheets

OTHER PUBLICATIONS

Internet Engineering Task Force Draft, "draft–kini–ospf–lsp–restoration–00txt," "Open Shortest Path First (OSPF) Protocol Extensions for Label Switched Path Restoration", Nov. 2000.

Internet Engineering Task Force Draft, "draft–ietf–mpls–recovery–frmwrk–02.text," "Framework for MPLS–Based Recovery", Mar. 2001.

Internet Engineering Task Force Draft, "draft–chang–mpls–path–protection–02.txt," "A Path Protection/Restoration Mechanism for MPLS Networks", Nov. 2000.

Internet Engineering Task Force Draft, "draft–katz–yeung–ospf–traffice–03.txt," "Traffic Engineering Extensions to OSPF", Sep. 2000.

Internet Engineering Task Force Draft, "draft–haskin–mpls–fast–reroute–05.txt," "A Method for Setting an Alternative Label Switched Paths to Handle Fast Reroute", Nov. 2000.

* cited by examiner

AVAILABLE BW TLV : PROTECTED LSPs WITH CLASSES

FIG.6

AVAILABLE BW TLV : UNPROTECTED LSPs WITH CLASSES

PATH REROUTING MECHANISM UTILIZING MULTIPLE LINK BANDWIDTH ALLOCATIONS

FIELD OF THE INVENTION

The present invention relates generally to data communications and more particularly relates to a path rerouting mechanism utilizing multiple link bandwidth allocations for use in networks employing link state advertising.

BACKGROUND OF THE INVENTION

Currently, the number of data networks and the volume of traffic these networks carry are increasing at an ever increasing rate. The network devices making up these networks generally consist of specialized hardware designed to move data at very high speeds. Typical asynchronous packet based networks, such as Ethernet or MPLS based networks, are mainly comprised of end stations, hubs, switches, routers, bridges and gateways. A network management system (NMS) is typically employed to provision, administer and maintain the network.

Multiprotocol Label Switching (MPLS) based networks are becoming increasingly popular especially in traffic engineering IP networks. MPLS uses a label switching model to switch data over a Label Switched Path (LSP). The route of an LSP is determined by the network layer routing function from the topology of the network and the demands of the user. Any suitable link state routing protocol may be used such as Open Shortest Path First (OSPF) or Intermediate System to Intermediate System (ISIS) routing protocol to provide the link state topology information needed by the network layer routing to engineer data traffic. LSPs may be setup using any suitable signaling protocol such as RSVP-TE or CR-LDP.

There is increasing demand by users that the IP network include a mechanism for fast repair of failed links or nodes. Since a LSP traverses a fixed path in the network, its reliability is dependent on the links and nodes along the path. It is common for many networks to provide some form of protection in the event of failure. For example, in the event of a link or node failure, the network can be adapted to switch data traffic around the failed element via a protection route.

The protection of traffic can be accomplished in several ways using the MPLS framework. Two ways that traffic can be protected using MPLS include recovery via LSP rerouting or via MPLS protection switching or rerouting actions.

The two basic models for path recovery include path rerouting and protection switching. Protection switching and rerouting may be used in combination. For example, protection switching provides a quick switchover to a recovery path for rapid restoration of connectivity while slower path rerouting determines a new optimal network configuration at a later time.

In recovery by path rerouting, new paths or path segments are established on demand for restoring traffic after the occurrence of a fault. The new paths may be chosen based upon fault information, network routing policies, predefined configurations and network topology information. Thus, upon detecting a fault, paths or path segments to bypass the fault are established using the signaling protocol. Note that reroute mechanisms are inherently slower than protection switching mechanisms, since more processing and configuring must be done following the detection of a fault. The advantage of reroute mechanisms is that they are simpler and cheaper since no resources are committed until after the fault occurs and the location of the fault is detected. An additional advantage of reroute mechanisms is that the LSP paths they create are better optimized, and therefore consume less network resources.

Note also that once the network routing algorithms have converged after a fault, it may be preferable to re-optimize the network by performing a reroute based on the current state of the network and network policies in place.

In contrast to path rerouting, protection switching recovery mechanisms pre-establish a recovery path or path segment based on network routing policies and the restoration requirements of the traffic on the working path. Preferably, the recovery path is link and node disjoint with the working path. When a fault is detected, the protected traffic is switched over to the recovery path(s) and restored.

The resources (i.e. bandwidth, buffers, processing, etc.) on the recovery path may be used to carry either a copy of the working path traffic or extra traffic that is displaced when a protection switch occurs leading to two subtypes of protection switching. In the first, known as 1+1 protection, the resources (bandwidth, buffers, processing capacity) on the recovery path are fully reserved, and carry the same traffic as the working path. Selection between the traffic on the working and recovery paths is made at the path merge LSR (PML).

In the second, known as 1:1 protection, the resources (if any) allocated on the recovery path are fully available to low priority or excess information rate (EIR) traffic except when the recovery path is in use due to a fault on the working path. In other words, in 1:1 protection, the protected traffic normally travels only on the working path, and is switched to the recovery path only when the working path has a fault. Once the protection switch is initiated, the low priority or EIR traffic being carried on the recovery path is displaced by the protected traffic. This method affords a way to make efficient use of the recovery path resources.

Figure 1:
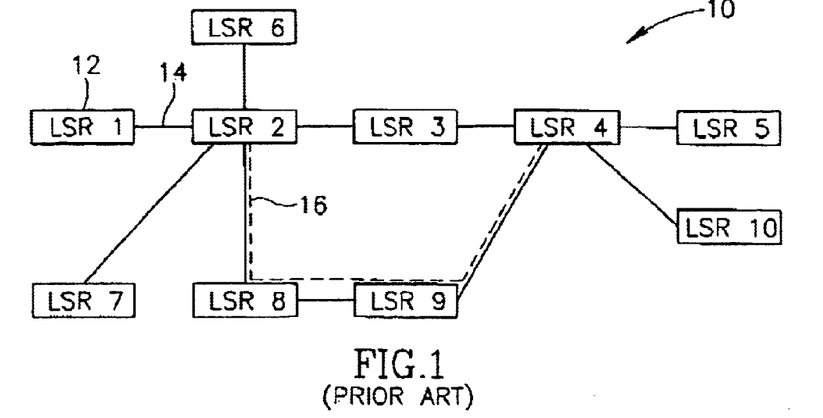
FIG. 1 is a diagram illustrating an example MPLS based network incorporating a bypass tunnel.

An example of protection switching in MPLS networks is described below. A diagram illustrating an example MPLS based network incorporating a bypass tunnel is shown in FIG. 1. The network, generally referenced 10, comprises a plurality of label switched routers (LSRs) 12 connected by links 14. Backup tunnels are established for protecting LSPs statically by the management station or using RSVP signaling. RSVP extensions for backup LSP tunnels have been defined. To meet the needs of real-time applications such as video on demand, voice over IP, etc., it is desirable to affect the repair of LSP tunnels within tens of milliseconds. Protection switching can provide such repair times.

For example, LSR1 creates a tunnel to LSR5 via the path [LSR1, LSR2, ISR3, LSR4, LSR5]. LSR2 can provide a repair by creating a partial backup tunnel [LSR2, LSR8, LSR9, LSR4], as shown by the dashed line 16, which merges with the original tunnel [LSR1, LSR2, LSR3, LSR4, LSR5] at LSR4. For each LSP to be backed up, another backup LSP is established.

The LSPs can also be protected (i.e. backed up) using the label stacking capabilities of MPLS Instead of creating a separate LSP for every backed-p LSP tunnel, a single LSP is created which serves to backup a set of tunnels. Such a tunnel is termed a bypass tunnel. The bypass tunnel itself is established just like any other LSP tunnel. The bypass tunnel must intersect the original tunnel(s) somewhere downstream of the point of repair. Note that this implies that the set of tunnels being backed up all pass through a common downstream node. Candidates for this set of tunnels include all tunnels that pass through the point of local repair and through this common node which do not use the facilities being bypassed.

To repair the backed up tunnels, packets belonging to a repaired tunnel are redirected onto the bypass tunnel. An additional label representing the bypass tunnel is stacked onto the redirected packets. At the last LSR of the bypass tunnel, the label for the bypass tunnel is popped off the stack, revealing the label that represents the tunnel being backed up. An alternative approach is to pop the bypass-tunnel label at the penultimate LSR of the bypass tunnel.

With reference to FIG. 1, LSR2 in this case would build a bypass tunnel [LSR2, LSR8, LSR9, LSR4] represented by the dashed line 16. The backup path for [LSR1, LSR2, LSR3, LSR4, LSR5] rejoins the original path at LSR4, but its path is now [LSR1, LSR2, LSR4, LSR5] with the bypass tunnel as the connection between LSR2 and LSR4.

Note that this bypass tunnel can also be a backup for tunnels from any of LSR1, LSR2, LSR6 or LSR8 to any of LSR4, LSR5, or LSR10 that traverse the path LSR2 to LSR3 to LSR4 in case of a failure of the link LSR2 to LSR3 or of the node LSR3. A bypass tunnel for protecting the link between LSR2 and LSR3 can also be created (this tunnel should start at LSR2 and end at LSR3).

The above describes the use of protection tunnels to quickly restore traffic after a link or a node failure. In some cases, the use of protection tunnels, however, does not protect against node failures. Due to the practice of sharing the same protection bandwidth between multiple protection tunnels, the case of multiple failures may result in there not being sufficient bandwidth to restore traffic on all the working LSPs that share the tunnel either by activating additional protection tunnels or by rerouting these LSPS In addition, when a link fails, the protection tunnels traversing that link are not available to protect other links in the event they fail. Thus, when a node or link fails, the part of the network that has its protection bandwidth available for protection tunnels does not allow creation of protection tunnels for these links. This means that the next node or link that fails will not be protected.

There is therefore a need for a protection mechanism that is capable of protecting working paths against failures that are not protected by a protection tunnel. Such failures include for example node failures and link failures that were not originally protected by a protection tunnel or were originally protected but the protection tunnel is not available.

SUMMARY OF THE INVENTION

The present invention provides a path reroute mechanism for use in communication networks. The mechanism comprises a multistage search for a routing path to restore traffic following a failure that could not be protected by a previously established protection route (i.e. protection tunnel, bypass, etc.). The invention is applicable for use in any traffic engineering scheme used to create connections in a network. The traffic engineering used must rely on some type of link state information advertising whereby the available bandwidths on each link is flooded throughout the network and used in making bandwidth calculations to insure that connections will provide previously agreed on Committed Information Rates (CIRs).

The invention is not limited by the type of network in use, the type of routing used to select the reroutes or by the signaling in use in the network. Examples of applicable networks include, but are not limited to, MPLS and Private Network to Network Interface (PNNI) based Asynchronous Transfer Mode (ATM) networks.

The path reroute mechanism comprises performing multiple searches for a route when a LSP is to be rerouted. Each search is performed on a different type of previously allocated link bandwidth. In the example embodiment presented herein, three different bandwidth types are defined including: bandwidth reserved for protection purposes, bandwidth reserved for protected paths (i.e. protected LSPs, LSPs that will be rerouted to the protection tunnel upon link failure) and bandwidth reserved for unprotected paths (i.e. unprotected LSPs).

In the event OSPF-TE is utilized in the network, only two additional TLVs need be defined since the OSPF-TE definition already contains a definition of a sub-TLV reflecting the value of the available bandwidth on the link. If the OSPF-TE sub-TLV reflects the entire available bandwidth in the link, then only TLVs (or sub-TLVs) for protected LSPs and for unprotected LSPs are required; the bandwidth for the protection bandwidth being derived from them.

Alternatively, the OSPF-TE sub-TLV may contain the bandwidth available for protected and unprotected LSPs. In this case two additional TLVs (or sub-TLVs) are defined, one for the available bandwidth of protected LSPs and one for the available bandwidth of protection tunnels.

Other combinations are also possible. Note that if there is no need to support unprotected LSPs, only a single TLV need be added above the one provided by the OSPF-TE protocol.

In any case, protection-tunnels flowing through a link do not reduce the amount of any of these values, since these tunnels do not usually forward any traffic.

Thus, in order for a node to be able to reroute a LSP, it must have knowledge about the availability of the different bandwidths on each link. This is achieved by having each node advertise the actual amount of bandwidth available on each link. Many routing protocols already include such a capability including, OSPF with traffic engineering extensions (OSPF-TE), ISIS, Border Gateway Protocol (BGP), ATM PNNI, etc.

When needing to route or reroute an LSP, the LSP-initiating node first runs a routing search algorithm such as Dijkstra but only on the links in which the available bandwidth exceeds the committed information rate (CIR) requirement of user LSPs. If this first search is not successful, the LSP-initiating node runs Dijkstra a second time but considering the bandwidth reserved for protection purposes as well as that reserved for non-protection purposes. If two types of user LSPs are required (i.e. protected and unprotected LSPs), a three step search is performed.

The mechanism of the present invention has the advantage of taking into account the existence of multiple traffic priority classes and the overbooking factor used by nodes in allocating bandwidth to LSPs. In many network implementations, the LSRs maintain a different overbooking factor for each priority class. Further, the overbooking factor is local to the LSR and is not necessarily known to the LSP initiating node.

The path reroute mechanism of the present invention provides several per link TLVs to be advertised by the routing protocol (e.g., OSPF-TE), that comprise link bandwidth availability information available for new LSPs in each priority class. TLVs are provided for the three types of available bandwidth on a link: protection bandwidth, bandwidth for protected LSPs and bandwidth for protected LSPs.

The information is received by each node and used when a path reroute is to be performed.

Although the invention is especially suited for implementation in software, it can also be implemented in hardware. In one embodiment, a network device comprising a processor, memory, etc. is operative to execute software adapted to perform the path rerouting mechanism of the present invention.

There is thus provided in accordance with the present invention a method of path routing in a network, the method comprising the steps of receiving link state advertising information generated by nodes within the network, the link state advertising information utilized to derive the bandwidth available on a particular link for protection paths, protected paths and unprotected paths, performing a first search for a path using only links having sufficient bandwidth available of a type the same as that of the path to be found to accommodate the path; if the first search is not successful then, performing a second search for a path using only links having sufficient combined bandwidth available reserved for protected paths and unprotected paths to accommodate the path; if the second search is not successful then, performing a third search for a path using only links having sufficient combined bandwidth available reserved for protection paths, protected paths and unprotected paths to accommodate the path and configuring appropriate nodes within the network in accordance with the path found.

There is also provided in accordance with the present invention a method of path routing in a network, the method comprising the steps of receiving link state advertising information generated by nodes within the network, the link state advertising information utilized to derive the bandwidth available on a particular link for protection paths and non-protection paths, performing a first search for a path using only links having sufficient bandwidth available reserved for non-protection paths to accommodate the path; if the first search is not successful then, performing a second search for a path using only links having sufficient combined bandwidth available reserved for protection paths and non-protection paths to accommodate the path and configuring appropriate nodes within the network in accordance with the path found.

There is further provided in accordance with the present invention a method of routing unprotected Label Switched Paths (LSPs) in a network, the method comprising the steps of receiving link state advertising information generated by nodes within the network, the link state advertising information utilized to derive the bandwidth available on a particular link for protection paths, protected paths and unprotected paths, performing a first search for a path using only links having sufficient available bandwidth for unprotected paths to accommodate the path; if the first search is not successful then, performing a second search for a path using only links having sufficient combined available bandwidth for protected paths and unprotected paths to accommodate the path; and if the second search is not successful then, performing a third search for a path using only links having sufficient combined available bandwidth for protection paths, protected paths and unprotected paths to accommodate the path.

There is also provided in accordance with the present invention a method of routing protected Label Switched Paths (LSPs) in a network, the method comprising the steps of receiving link state advertising information generated by nodes within the network, the link state advertising information utilized to derive the bandwidth available on a particular link for protection paths, protected paths and unprotected paths, performing a first search for a path using only links having sufficient available bandwidth for protected paths to accommodate the path; if the first search is not successful then, performing a second search for a path using only links having sufficient combined available bandwidth for protected paths and unprotected paths to accommodate the path; and if the second search is not successful then, performing a third search for a path using only links having sufficient combined available bandwidth for protection paths, protected paths and unprotected paths to accommodate the path.

There is still further provided in accordance with the present invention a network device, comprising one or more line PHY line interfaces for interfacing the network device to one or more communication links, a switch adapted to switch data between a plurality of ingress inputs and a plurality of egress outputs, a processor, memory means coupled to the processor, software means operative on the processor for receiving link state advertising information generated by nodes within the network, the link state advertising information utilized to derive the bandwidth available on a particular link for protection paths, protected paths and unprotected paths, performing a first search for a path using only links having sufficient bandwidth available of a first type the same as that of the path to be found to accommodate the path; if the first search is not successful then, performing a second search for a path using only links having sufficient combined available bandwidth of a second type opposite of that of the path to be found to accommodate the path; and if the second search is not successful then, performing a third search for a path using only links having sufficient protection path bandwidth available to accommodate the path.

There is also provided in accordance with the present invention a computer program product for use in a network device, the computer program product comprising a computer useable medium having computer readable program code means embodied in the medium for performing a path reroute in a network, the computer program product comprising computer readable program code means for advertising link state information utilized to derive the bandwidth available on a particular link for protection paths, protected paths and unprotected paths, computer readable program code means for performing a first search for a path using only links having sufficient bandwidth available of a type the same as that of the path to be found to accommodate the path, computer readable program code means for performing a second search, if the first search is not successful, for a path using only links having sufficient combined bandwidth available reserved for protected paths and unprotected paths to accommodate the path and computer readable program code means for performing a third search, if the second search is not successful, for a path using only links having sufficient combined bandwidth available reserved for protection paths, protected paths and unprotected paths to accommodate the path.

BRIEF DESCRIPTION OF THE DRAWINGS

The invention is herein described, by way of example only, with reference to the accompanying drawings, wherein.

DETAILED DESCRIPTION OF THE INVENTION

Notation Used Throughout

The following notation is used throughout this document.

| Term | Definition |
|---|---|
| ASIC | Application Specific Integrated Circuit |
| ATM | Asynchronous Transfer Mode |
| BGP | Border Gateway Protocol |
| CD-ROM | Compact Disc-Read Only Memory |
| CIR | Committed Information Rate |
| CPU | Central Processing Unit |
| CR-LDP | Constraint-based Label Distribution Protocol |
| DAT | Digital Audio Tape |
| DSP | Digital Signal Processor |
| DVD | Digital Versatile Disk |
| EEPROM | Electrically Erasable Programmable Read Only Memory |
| EEROM | Electrically Erasable Read Only Memory |
| EPROM | Erasable Programmable Read Only Memory |
| FDDI | Fiber Distributed Data Interface |
| FIS | Failure Indication Signal |
| FPGA | Field Programmable Gate Array |
| FRS | Fault Recovery Signal |
| IP | Internet Protocol |
| ISIS | Intermediate System to Intermediate System |
| LAN | Local Area Network |
| LD | Link Degraded |
| LDP | Label Distribution Protocol |
| LF | Link Failure |
| LSP | Label Switched Path |
| LSR | Label Switching Router |
| MPLS | Multi-Protocol Label Switching |
| NIC | Network Interface Card |
| NMS | Network Management System |
| OSPF | Open Shortest Path First |
| OSPF-TE | Open Shortest Path First with Traffic Engineering |
| PG | Path Group |
| PML | Path Merge LSR |
| PNNI | Private Network to Network Interface |
| PPG | Protected Path Group |
| PSL | Path Switch LSR |
| PTP | Protected Traffic Portion |
| RAM | Random Access Memory |
| ROM | Read Only Memory |
| RSVP | Reservation Protocol |
| RSVP-TE | Reservation Protocol with Traffic Engineering extensions |
| SDH | Synchronous Data Hierarchy |
| SONET | Synchronous Optical Network |
| TLV | Type, Length, Value object |

Definitions Used Throughout

The following terms and definitions apply throughout this document.

Rerouting is defined as a procedure for changing the route of a traffic path. Rerouting can serve as a recovery mechanism in which the broken path, the recovery path or segments of these paths are created dynamically after the detection of a fault on the working path. In other words, rerouting can serve as a recovery mechanism in which the recovery path is not pre-established. Rerouting can also serve as an optimization mechanism in which path routes are dynamically changed to ones that are better suited for current network conditions.

Protection switching is defined as a recovery mechanism in which the recovery path is created prior to the detection of a fault on the working path, path segment or network segment it protects. In other words, a recovery mechanism in which the recovery path is pre-established.

Protection bandwidth is defined as bandwidth on a link reserved for protection purposes, e.g., protection tunnels, bypass tunnels, recovery path, detour paths and protection paths.

The working path is the protected path that carries traffic before the occurrence of a fault. The working path exists, in MPLS networks for example, between a PSL and PML The working path can be of different kinds; a hop-by-hop routed path, a trunk, a link, an LSP, part of an LSP, a group of LSP parts or part of a multipoint-to-point LSP. The terms primary path and active path are synonyms for a working path.

The recovery path is the path by which traffic is restored after the occurrence of a fault. In other words, the path on which the traffic is directed by the recovery mechanism. The recovery path may be established by MPLS means. The terms back-up path, alternative path and protection path are synonyms for a recovery path.

The protection counterpart is the 'other' path when discussing pre-planned protection switching schemes. The protection counterpart for the working path is the recovery path and vice-versa.

A path group (PG) is a logical bundling of multiple working paths, each of which is routed identically between a Path Switch LSR and a Path Merge LSR. A protected path group (PPG) is a path group that requires protection. A protected traffic portion (PIP) is the portion of the traffic on an individual path that requires protection.

The path switch LSR (PSL) is an LSR responsible for switching or replicating the traffic between the working path and the recovery path. The path merge LSR (PML) is an LSR that receives both working path traffic and its corresponding recovery path traffic, and either merges their traffic into a single outgoing path, or, if it is itself the destination, passes the traffic on to the higher layer protocols.

An intermediate LSR is an LSR on a working or recovery path that is neither a PSL nor a PML for that path. A bypass tunnel is a path that serves to back up a set of working paths using the label stacking approach in MPLS. The working paths and the bypass tunnel must all share the same path switch LSR (PSL) and the path merge LSR (PML).

A switchover is the process of switching the traffic from the path that the traffic is flowing on onto one or more alternate path(s). This may involve moving traffic from a working path onto one or more recovery paths, or may involve moving traffic from a recovery path(s) on to a more optimal working path(s). A switchback is the process of returning the traffic from one or more recovery paths back to the working path(s).

Revertive mode refers to a recovery mode in which traffic is automatically switched back from the recovery path to the original working path upon the restoration of the working path to a fault-free condition. This assumes a failed working path does not automatically surrender resources to the network. Non-revertive mode refers to a recovery mode in which traffic is not automatically switched back to the original working path after this path is restored to a fault-condition. Note that depending on the configuration, the original working path may, upon moving to a fault-free condition, become the recovery path, or it may be used for new working traffic, and no longer be associated with its original recovery path.

MPLS protection domain refers to the set of LSRs over which a working path and its corresponding recovery path are routed MPLS protection plan refers to the set of all LSP protection paths and the mapping from working to protection paths deployed in an MPLS protection domain at a given time.

A liveness or keep alive message is a message exchanged periodically between two adjacent LSRs that serve as a link probing mechanism. It provides an integrity check of the forward and the backward directions of the link between the two LSRs as well as a check of neighbor aliveness. A path continuity test is a test that verifies the integrity and continuity of a path or path segment.

A path failure (PF) is a fault detected by MPLS-based recovery mechanisms, which is defined as the failure of the keep alive message test or a path continuity test, which indicates that path connectivity is lost. Path degraded is a fault detected by MPLS-based recovery mechanisms that indicates that the quality of the path is unacceptable. A link failure (LF) is a lower layer fault indicating that link continuity is lost. This may be communicated to the MPLS-based recovery mechanisms by the lower layer. Link degraded (LD) is a lower layer indication to MPLS-based recovery mechanisms that the link is performing below an acceptable level.

A fault indication signal (FIS) is a signal that indicates that a fault along a path has occurred. It is relayed by each intermediate LSR to its upstream or downstream neighbor, until it reaches an LSR that is setup to perform MPLS recovery. The FIS is transmitted periodically by the node/nodes closest to the point of failure, for some configurable length of time.

A fault recovery signal (FRS) is a signal that indicates a fault along a working path has been repaired. Again, like the FIS, it is relayed by each intermediate LSR to its upstream or downstream neighbor, until it reaches the LSR that performs recovery of the original path. The FRS is transmitted periodically by the node/nodes closest to the point of failure, for some configurable length of time.

The term MPLS-based recovery refers to the ability to quickly and completely restore traffic lost due to a fault in an MPLS-network. The fault may be detected on the MPLS layer or in lower layers over which MPLS traffic is transported. The fastest MPLS recovery is typically achieved using protection switching. The MPLS LSR switchover time is comparable to the 50 ms switchover time of SONET.

DETAILED DESCRIPTION OF THE INVENTION

The present invention provides a path reroute mechanism for use in communication networks. The mechanism comprises a multistage search for a routing path to restore traffic following a failure that could not be protected by a previously established protection route (i.e. protection tunnel, bypass, etc.). The invention is applicable for use in any traffic engineering technique used to create connections in a network. The traffic engineering used must rely on some type of link state information advertising whereby the available bandwidths on each link is flooded throughout the network and used in making bandwidth calculations to insure that connections will provide previously agreed on Committed Information Rates (CIRs). The invention is not limited by the type of network in use, the type of routing used to select the reroutes or by the or signaling in use in the network. Examples of applicable networks include, but are not limited to, MPLS and Prvate Network to Network Interface (PNNI) based Asynchronous Transfer Mode (ATM) networks.

For illustration purposes, the principles of the present invention are described in the context of an MPLS based network employing any suitable routing such as OSPF-TE and signaling such as RSVP-TE signaling. Further, it is intended that the mechanism of the present invention is be implemented in network devices such as routers (e.g., LSRs in MPLS networks) located within the network. It is not intended, however, that the invention be limited to the configurations and embodiments described herein. It is appreciated that one skilled in the networking, electrical and/or software arts may apply the principles of the present invention to numerous other types of networking devices and network configurations as well without departing from the spirit and scope of the invention.

As described supra, one type of protection scheme used in MPLS networks is based on providing protection tunnels for working links. In order that sufficient bandwidth be available for these protection channels, the links that protection tunnels traverse should not be allocated with more than a certain amount of CIR traffic. This ensures that enough bandwidth remains free for the use of these protection-tunnels when needed.

Since protection tunnels do not provide protection against all types of failures (e.g., like arbitrary number of simultaneous faults, node failures, etc.), it is preferable that the RSVP-TE (or any other suitable signaling protocol) based rerouting mechanism be able to reroute LSPs that are currently routed through failed parts of the network. The rerouted paths should be established without using bandwidth originally reserved for protection purposes. In the event, however, that the reroute cannot be established otherwise, than bandwidth reserved for protection purposes is used.

Thus, in accordance with the present invention, the path rerouting mechanism is operative such that the percentage of the bandwidth reserved for protection purposes is only used for rerouting CIR LSPs when no other type of bandwidth is available. This percentage of bandwidth saved for protection purposes is referred to as protection bandwidth.

The path reroute mechanism comprises performing multiple searches for a route when a LSP is to be rerouted. Each search is performed on a larger and larger portion of the total available bandwidth of the link. In the example embodiment presented herein, three different bandwidth types are defined including: bandwidth reserved for protection purposes, bandwidth reserved for protected paths (i.e. protected LSPs) and bandwidth reserved for unprotected paths (i.e. unprotected LSPs). Thus, is the first attempt to find a route, only a portion of the available bandwidth of each link is considered. If no route is found, a second search is performed considering a larger portion of the available bandwidth and if a route is still not found, a third search is performed considering 100% of the available bandwidth of the links.

Thus, in order for a node to be able to reroute a LSP, it must have knowledge about the availability of the different bandwidths on each link. This is achieved by having each node advertise the actual amount of bandwidth available on each link. Many routing protocols already include such a capability including, for example, OSPF with traffic engineering extensions (OSPF-TE), ATM's PNNI, etc.

When needing to route or reroute an LSP, the LSP-initiating node first runs a routing search algorithm such as Dijkstra but only on the links in which the available bandwidth does not exceed the bandwidth allocated for user-LSPs when calculated after the LSP is rerouted to use that link. If this first search does not succeed, the LSP-initiating node runs Dijkstra a second time but considering the bandwidth reserved for protection purposes as well as that reserved for non-protection purposes. If the user-LSPs are subdivided into protected LSPs and unprotected LSPs, a three search process is performed.

In addition, a background process in each node attempts to reroute LSPs that are not using an optimal path. This process will try to reroute LSPs that go through links in which the available bandwidth is less than the protection path bandwidth.

In order that multiple nodes to not become synchronized in trying to reroute paths at the same time, an element of randomness is added in that the iterations of the rerouting process are not of constant duration.

Note that the LSP initiating node (i.e. the node desiring to reroute a LSP) performs the multiple search mechanism of the present invention. Other network entities, however, may also perform the mechanism of the present invention providing they have the information necessary to execute the method of the invention.

The mechanism of the present invention is adapted to take into account the existence of multiple traffic priority classes and the overbooking factor used by nodes in allocating bandwidth to LSPs. In many network implementations, the LSRs maintain a different overbooking factor for each priority class. Further, the overbooking factor is local to the LSR and is not necessarily known to the LSP initiating node. Thus, in accordance with the invention, the available bandwidth values advertised by each node already have the overbooking factor factored into them. Thus, the available bandwidth values used by the LSP initiating node in its route search accurately represent the amount of bandwidth available on that link.

The path reroute mechanism of the present invention provides several per link TLVs (or sub-TLVs) to be advertised by the routing protocol (e.g., OSPF-TE), that comprise link bandwidth availability information available for new LSPs in each priority class. TLVs are provided for the three types of available bandwidth on a link: protection bandwidth, bandwidth for protected LSPs and bandwidth for protected LSPs. As described supra, a few variations of the way this information can be provided, for example by taking advantage of the OSPF-TE TLV for link available bandwidth, by providing less information (e.g., not supporting non-protected LSP bandwidth information distribution) or by providing the value of different subsets of the bandwidth of the link.

The structure of the various TLVs is described hereinbelow. Each link in the network is adapted to advertise at least three values: (1) the amount of protection bandwidth available which is the bandwidth available for protection purposes; (2) the amount of bandwidth available for protected LSPs, i.e. LSPs that are protected by a protection tunnel (or tunnels) on other links; and (3) the amount of bandwidth available for unprotected LSPs, i.e. LSPs that are not protected by any protection tunnels. As stated hereinabove, several variations are possible, including using the link-bandwidth sub-TLV provided by the OSPF-TE protocol instead of one of these three TLVs as well as advertising less information.

Allowing protected and unprotected LSPs to be established permits less than 50% of the bandwidth to be kept aside for protection tunnels. For example, 30% of the bandwidth may be reserved for protection tunnels, 30% for protected LSPs and 40% for unprotected LSPs.

Figure 2:
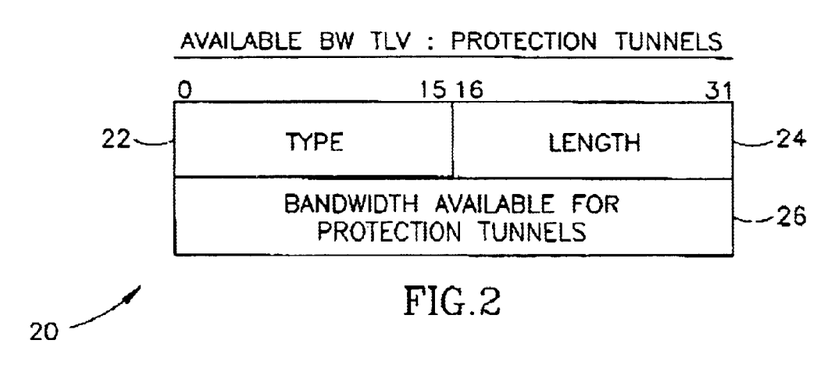
FIG. 2 is a diagram illustrating the protection tunnel available bandwidth TLV object in accordance with the present invention.

A diagram illustrating the protection tunnel available bandwidth TLV object in accordance with the present invention is shown in FIG. 2. The TLV illustrated, generally referenced 20, is used to advertise the bandwidth available for protection tunnel purposes. The TLV comprises a unique type field 22 indicative of the contents of the TLV, a length field 24 indicating that the length of the value field is 4 bytes and the value 26 representing the bandwidth available for protection tunnels represented in a suitable format, e.g., 32 bit IEEE floating point format. Note that the value of this ILV object should not change when protection tunnels are routed through that link, but only when user-LSPs start using more than the bandwidth allocated for user-LSPs and start using the bandwidth that is reserved for protection purposes. Note also that alternatively, this TLV may be a sub-TLV of another TLV-object.

Figure 3:
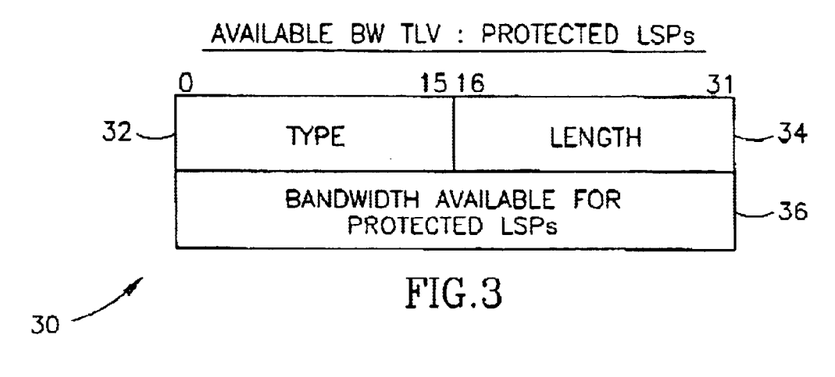
FIG. 3 is a diagram illustrating the protected path available bandwidth TLV object in accordance with the present invention.

A diagram illustrating the protected path available bandwidth TLV object in accordance with the present invention is shown in FIG. 3. The TLV illustrated, generally referenced 30, is used to advertise the bandwidth available for establishment of protected LSPs. The TLV comprises a unique type field 32 indicative of the contents of the TLV, a length field 34 (4 bytes) and the value 36 representing the bandwidth available for protected LSPs represented in a suitable format, e.g., 32 bit IEEE floating point format.

Figure 4:
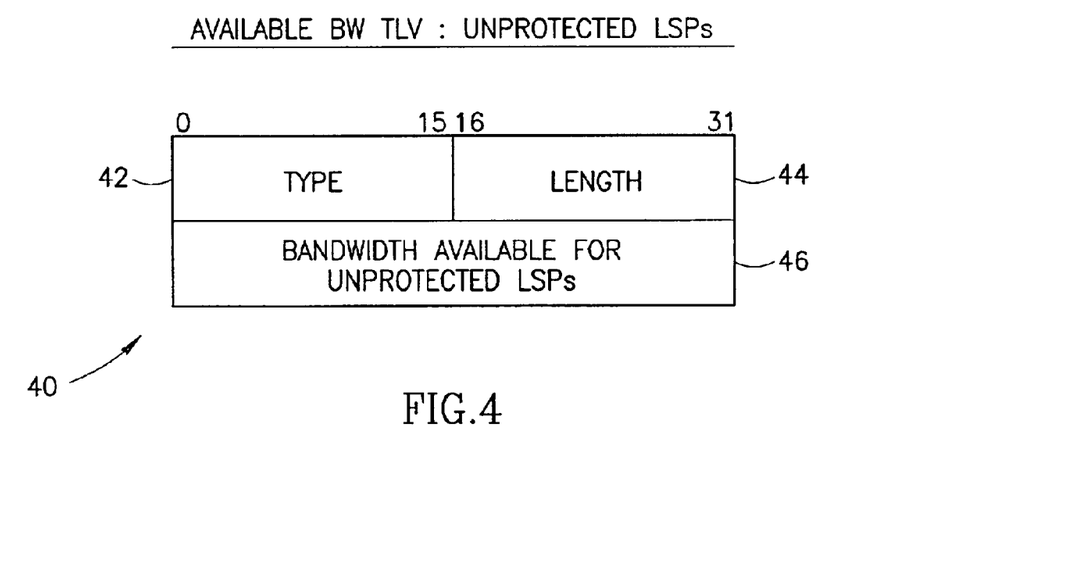
FIG. 4 is a diagram illustrating the unprotected path available bandwidth TLV object in accordance with the present invention.

A diagram illustrating the unprotected path available bandwidth TLV object in accordance with the present invention is shown in FIG. 4. The TLV illustrated, generally referenced 40, is used to advertise the bandwidth available for establishment of unprotected LSPs. The TLV comprises a unique type field 42 indicative of the contents of the TLV, a length field 44 (4 bytes) and the value 46 representing the bandwidth available for unprotected LSPs represented in a suitable format, e.g., 32 bit IM floating point format.

The invention also provides an additional three TLVs for use in networks with different priority classes. The example TLVs described infra include bandwidth values for eight priority classes. Alternatively, the TLVs can be modified to accommodate any number of priority classes or any other types of classes).

Figure 5:
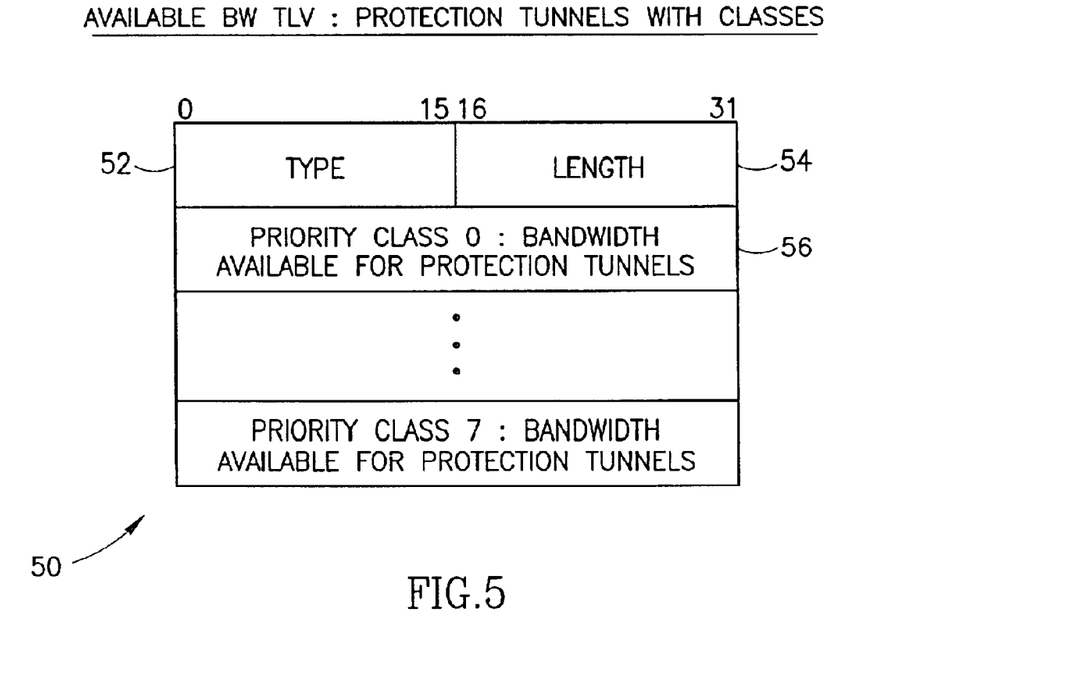
FIG. 5 is a diagram illustrating the protection tunnel available bandwidth TLV object including a plurality of priority classes in accordance with the present invention.

A diagram illustrating the protection tunnel available bandwidth TLV object including a plurality of priority classes in accordance with the present invention is shown in FIG. 5. The TLV illustrated, generally referenced 50, is used to advertise the bandwidth available for protection tunnel purposes for each of eight priority classes. The TLV comprises a unique type field 52 indicative of the contents of the TLV, a length field 54 indicating that the value length is 32 bytes and eight values 56 representing the bandwidth available for protection tunnels for each of eight priority classes, each represented in a suitable format, e.g., 32 bit IEEE floating point format.

Figure 6:
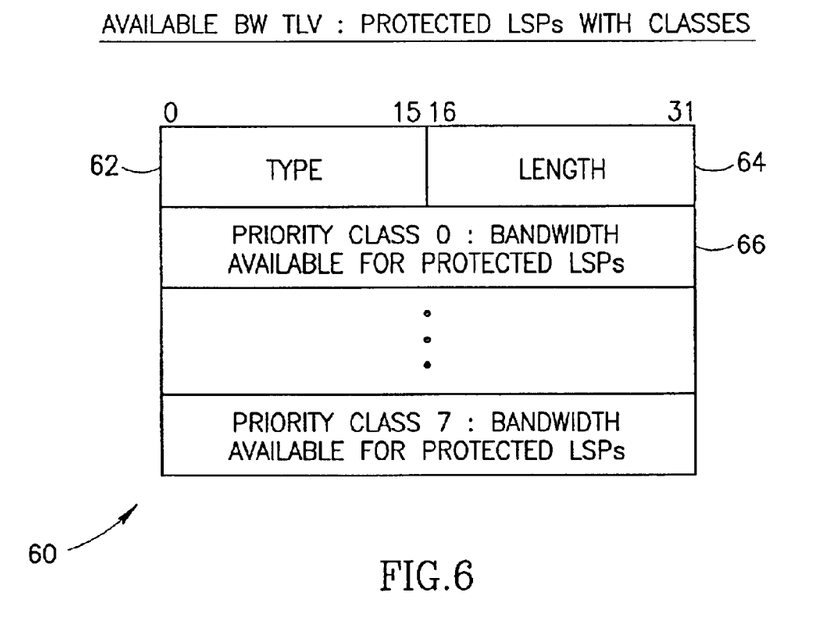
FIG. 6 is a diagram illustrating the protected path available bandwidth TLV object including a plurality of priority classes in accordance with the present invention.

A diagram illustrating the protected path available bandwidth TLV object including a plurality of priority classes in accordance with the present invention is shown in FIG. 6. The TLV illustrated, generally referenced 60, is used to advertise the bandwidth available for protected LSPs for each of eight priority classes. The TLV comprises a unique type field 62 indicative of the contents of the TLV, a length field 64 (32 bytes) and eight values 66 representing the bandwidth available for protected LSPs for each of eight priority classes, each represented in a suitable format, e.g., 32 bit IEEE floating point format.

Figure 7:
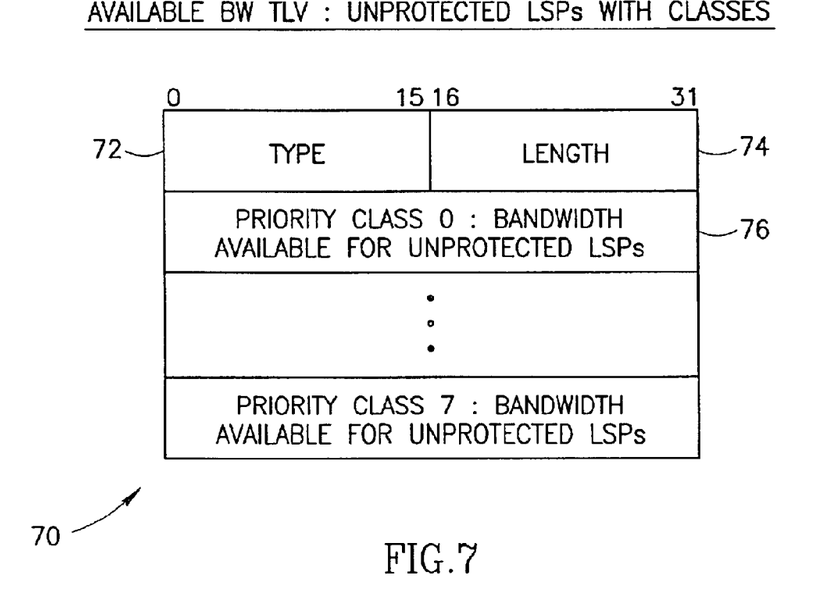
FIG. 7 is a diagram illustrating the unprotected path available bandwidth TLV object including a plurality of priority classes in accordance with the present invention.

A diagram illustrating the unprotected path available bandwidth TLV object including a plurality of priority classes in accordance with the present invention is shown in FIG. 7. The TLV illustrated, generally referenced 70, is used to advertise the bandwidth available for unprotected LSPs for each of eight priority classes. The TLV comprises a unique type field 72 indicative of the contents of the TLV, a length field 74 (32 bytes) and eight values 76 representing the bandwidth available for unprotected LSPs for each of eight priority classes, each represented in a suitable format, e.g., 32 bit IEEE floating point format.

Figure 8:
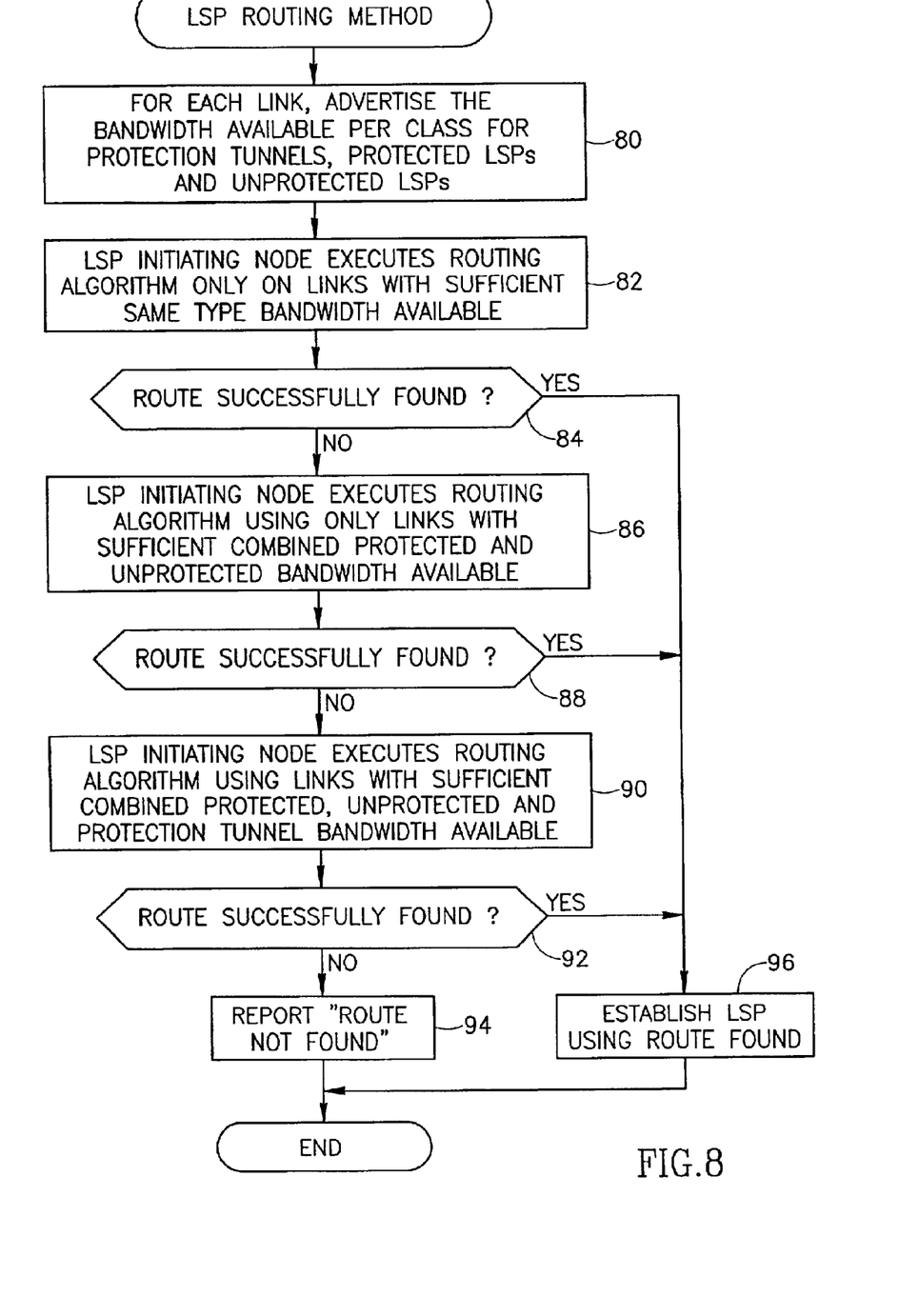
FIG. 8 is a flow diagram illustrating the path reroute mechanism of the present invention.

The path reroute mechanism of the present invention will now be described in more detail. A flow diagram illustrating the path reroute mechanism of the present invention is shown in FIG. 8. Each link in the network is adapted to advertise the bandwidth available on an optional per priority class basis for protection tunnels, protected LSPs and unprotected LSPs (step 80). Note that this step is performed by the nodes (e.g., LSRs) in the network for each of the links connected thereto. Note also that the values advertised for a link indicating the bandwidth available for protection tunnels, do not change when one of more protection tunnels are configured or rerouted to flow through the link. These values are altered accordingly when user-LSPs with CIR begin using this bandwidth because the bandwidth allocated for them within the link is exhausted.

When a path (e.g., LSP) is to be rerouted for whatever reason, the LSP initiating node executes the routing algorithm only on the links with sufficient bandwidth available of the same type as that of the LSP to be routed (step 82). If the LSP to be routed is a protected LSP, then the first routing search is performed using links with sufficient available bandwidth for protected LSPs. Conversely, if the LSP to be routed is an unprotected LSP, then the first routing search is performed using links with sufficient available bandwidth for unprotected LSPs. Note that any suitable routing algorithm may be used, such as the well known Dijkstra algorithm.

If a route was found (step 84), the LSP is established using the route found (step 96). If a route was not found, however, a second routing search is performed. In this second search, the LSP initiating node executes the routing algorithm considering the combined available bandwidths reserved for both protected and unprotected LSPs (step 86). The search algorithm only uses links having sufficient combined protected and unprotected bandwidth.

If a route was found (step 88), the LSP is established using the route found (step 96). If a route was not found, however, a third routing search is performed. In this third search, the LSP initiating node executes the routing algorithm considering the combined available bandwidths reserved for protection tunnels, protected LSPs and unprotected LSPs (step 90). Only links with sufficient bandwidth available are used in the route search. Thus, if the route cannot be established using the combined available bandwidth reserved for protected and unprotected LSPs, the route is attempted using the protection tunnel bandwidth.

If a route was found (step 92), the LSP is established using the route found and the bandwidth available in all three bandwidth allocation groups. If a route still cannot be found after the third search, a message such as 'Route not found' is returned.

Note that, as described supra, the routing algorithm may comprise only two searches such as in the event protected and unprotected LSP bandwidth are combined within a single bandwidth allocation for non-protection purposes. In this case, when needing to route or reroute an LSP, the LSP-initiating node first performs the search algorithm on the links in which the available bandwidth exceeds the CIR requirement of user LSP. If this first search fails, a second search is performed considering the bandwidth reserved for protection purposes as well as that reserved for non-protection purposes.

In accordance with the invention, the rerouting algorithm of the present invention is applicable in various cases. One is when a failure or a series of failures is not completely covered by the fast protection mechanism and rerouting is performed in order to fix the LSPs broken due to these failures. A second case is when there is a need to optimize LSPs after a failure, since the fast protection mechanism routes packets over non-optimized paths. A third case is in optimizing rerouting after a topology change (e.g., link or node recovery) or as part of a periodic optimization process. When rerouting a working-LSP, such as in the last two cases, the rerouting should not be put into place if the new calculated LSP uses bandwidth allocated for protection tunnels in all or part of its links, while the existing LSP does not. One possible scheme is to prefer the route in which less links are over occupied.

Network Device/LSR Embodiment

An example network device is operative to execute software adapted to perform the path rerouting mechanism of the present invention or any portion thereof. Hardware and software means adapted to execute the mechanism may be incorporated within a network device such as a Network Management System, Label Switching Router (LSR) or any other wired or wireless network device. The device may be constructed using any combination of hardware and/or software.

Figure 9:
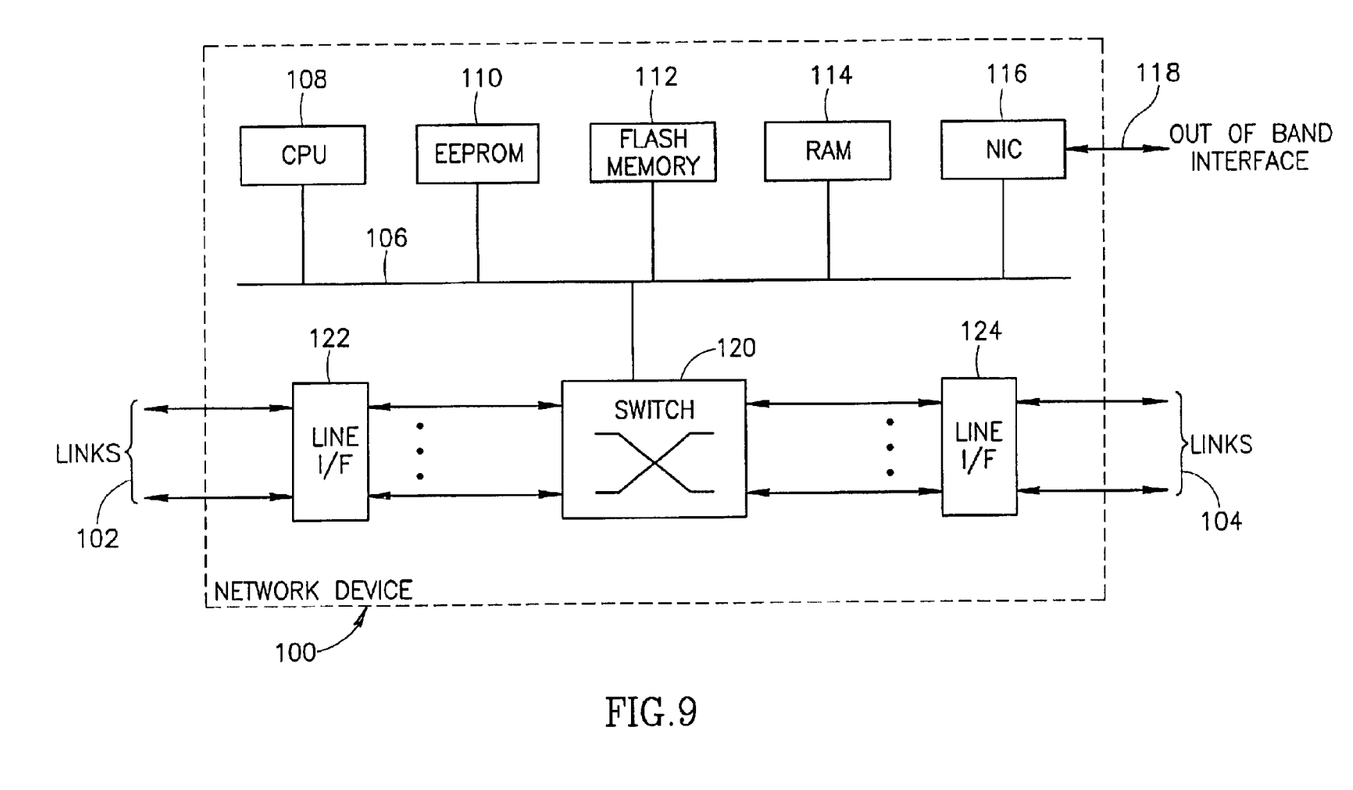
FIG. 9 is a block diagram illustrating an example network device such as a link switched router incorporating the path reroute mechanism of the present invention.

A block diagram illustrating an example network device such as a link switched router incorporating the path reroute mechanism of the present invention is shown in FIG. 9. The network device, generally referenced 100, comprises a processor 108 which may be implemented as a microcontroller, microprocessor, microcomputer, ASIC core, FPGA core, central processing unit (CPU) or digital signal processor (DSP). The system further comprises non volatile memory including EEPROM 110 for storing configuration and network related parameters, Flash memory 112 for storing program code and configuration parameters and dynamic main memory (e.g., RAM) 114 all in communication with the processor. The processor is also in communication, via a bus 106, with a number of peripheral devices that are also included in the computer system. A single modular LSR may be built of a number of modules (e.g., cards), each containing part of the switching fabric and a number of line interfaces. Each such module may contain a CPU subsystem of its own, including CPU and volatile as well as non-volatile memory.

The network device comprises a NIC 116 for providing an out of band interface 118 for connecting to external entities such as a craft for local maintenance and configuration purposes, a NMS for centralized administration and control or a Local Area Network (LAN). The device: may comprise additional interfaces, such as a serial interface for connecting to a PC for configuration purposes. The network device also comprises a switching core 120, which is adapted to perform the switching function of the network device. The switch may comprise, for example, hardware for performing MPLS switching, hardware for performing Frame Relay switching or hardware for performing ATM switching.

One or more line interface cards 122, 124 provide the PHY interface to two way communication links 102, 104. As an example, the interface cards may be adapted to interface to any combination of the following communication links: any variety of copper or optical based Ethernet, Token Ring, FDDI, SONET/SDH, ATM.

The network device also comprises an optional user interface adapted to respond to user inputs and provide feedback and other status information. A host interface enabled communication with a host computing device. The host may be adapted to configure, control and maintain the operation of the device. The device may also comprise magnetic storage device means for storing application programs and data.

The network device comprises computer readable storage medium which may include any suitable memory means including but not limited to magnetic storage, optical storage, CD-ROM drive, ZIP drive, DVD drive, DAT cassette, semiconductor based volatile or non-volatile memory, biological memory devices, or any other memory storage device.

Software operative to implement the functionality of the path reroute mechanism of the present invention is adapted to reside on a computer readable medium, such as a magnetic disk within a disk drive unit or any other volatile or nonvolatile memory. Alternatively, the computer readable medium may comprise a floppy disk, Flash memory, EPROM, EEROM, EEPROM based memory, bubble memory storage, ROM storage, etc. The software adapted to perform the path reroute mechanism of the present invention or any portion thereof may also reside, in whole or in part, in the static or dynamic main memories or in firmware within the processor of the network device (i.e. within microcontroller, microprocessor, microcomputer, DSP, etc. internal memory).

In alternative embodiments, the method of the present invention may be applicable to implementations of the invention in integrated circuits, field programmable gate arrays (FPGAs), chip sets or application specific integrated circuits (ASICs), DSP circuits, wireless implementations and other communication system products.

It is intended that the appended claims cover all such features and advantages of the invention that fall within the spirit and scope of the present invention. As numerous modifications and changes will readily occur to those skilled in the art, it is intended that the invention not be limited to the limited number of embodiments described herein. Accordingly, it will be appreciated that all suitable variations, modifications and equivalents may be resorted to, falling within the spirit and scope of the present invention.

What is claimed is:

1. A method of path routing in a network, said method comprising the steps of:
   receiving link state advertising information generated by nodes within said network, said link state advertising information utilized to derive available bandwidth on a particular link for protection paths, protected paths and unprotected paths;
   performing a first search for a path using only links having sufficient bandwidth available of a type the same as that of the path to be found to accommodate said path; if said first search is not successful then,
   performing a second search for a path using only links having sufficient combined bandwidth available reserved for protected paths and unprotected paths to accommodate said path; if said second search is not successful then,
   performing a third search for a path using only links having sufficient combined bandwidth available reserved for protection paths, protected paths and unprotected paths to accommodate said path; and
   configuring appropriate nodes within said network in accordance with the path found.

2. The method according to claim 1, wherein the bandwidth available reserved for protection paths represents the bandwidth of a link that is saved for protection path uses and that is not currently allocated for non-protection paths.

3. The method according to claim 1, wherein said type comprises bandwidth available for unprotected paths if the path to be found is to use bandwidth reserved for unprotected paths.

4. The method according to claim 1, wherein said type comprises bandwidth available for protected paths if the path to be found is to use bandwidth reserved for protected paths.

5. The method according to claim 1, wherein said link state advertising information comprises one or more type, length, value (TLV) objects flooded using a link state routing protocol, wherein said one or more TLVs optionally function as sub-TLVs of other TLVs.

6. The method according to claim 1, wherein said routing protocol is chosen from the group comprising the Open Shortest Path First (OSPF) protocol, OSPF extensions, OSPF-TE or OSPF-TE extensions.

7. The method according to claim 1, wherein said routing protocol comprises the Intermediate System to Intermediate System (ISIS) protocol or any extensions thereof.

8. The method according to claim 1, wherein said routing protocol comprises the Private Network to Network Interface (PNNI) protocol or any extensions thereof.

9. The method according to claim 1, wherein said link state information relating to the bandwidth available on a particular link is apportioned in accordance with a plurality of classes for the available bandwidth of said protection paths, a plurality of classes for the available bandwidth of said protected paths and a plurality of classes for the available bandwidth of said unprotected paths.

10. The method according to claim 1, wherein said link state information relating to the bandwidth available on a particular link comprises a first TLV adapted to indicate bandwidth available for protected-LSPs, a second TLV adapted to indicate bandwidth available for unprotected-LSPs and a third TLV adapted to indicate total available bandwidth.

11. The method according to claim 1, wherein said link state information relating to the bandwidth available on a particular link comprises a first TLV adapted to indicate bandwidth available for protected-LSPs for a plurality of classes, a second TLV adapted to indicate bandwidth available for unprotected-LSPs for a plurality of classes and a third TLV adapted to indicate total available bandwidth for a plurality of classes.

12. The method according to claim 1, wherein said first search, said second search and said third searches are is performed utilizing the Dijkstra algorithm.

13. The method according to claim 1, wherein said the configuration of nodes within said network utilizes Reservation Protocol (RSVP) signaling, RSVP-TE or any extensions thereof.

14. The method according to claim 1, wherein said the configuration of nodes within said network utilizes LDP signaling, CR-LDP or any extensions thereof.

15. The method according to claim 1, wherein said step of configuring nodes within said network comprises configuring the Multiprotocol Label Switching (MPLS) forwarding within the nodes.

16. The method according to claim 1, further comprising the steps of re-calculating and re-advertising the available bandwidth for protection paths, protected paths and unprotected paths in response to changes in network topology.

17. The method according to claim 1, further comprising the steps of recalculating and re-advertising the available bandwidth for protection paths, protected paths and unprotected paths in response to changes in the link state of said network.

18. A method of path routing in a network, said method comprising the steps of:
receiving link state advertising information generated by nodes within said network, said link state advertising information utilized to derive available bandwidth on a particular link for protection paths and non-protection paths;
performing a first search for a path using only links having sufficient bandwidth available reserved for non-protection paths to accommodate said path; if said first search is not successful then,
performing a second search for a path using only links having sufficient combined bandwidth available reserved for protection paths and non-protection paths to accommodate said path; and
configuring appropriate nodes within said network in accordance with the path found.

19. A method of routing unprotected Label Switched Paths (LSPs) in a network, said method comprising the steps of:
receiving link state advertising information generated by nodes within said network, said link state advertising information utilized to derive available bandwidth on a particular link for protection paths, protected paths and unprotected paths;
performing a first search for a path using only links having sufficient available bandwidth for unprotected paths to accommodate said path; if said first search is not successful then,
performing a second search for a path using only links having sufficient combined available bandwidth for protected paths and unprotected paths to accommodate said path; and if said second search is not successful then,
performing a third search for a path using only links having sufficient combined available bandwidth for protection paths, protected paths and unprotected paths to accommodate said path.

20. The method according to claim 19, further comprising the step of configuring appropriate nodes within said network in accordance with the path found.

21. The method according to claim 19, wherein the bandwidth available reserved for protection paths represents the bandwidth of a link that is saved for protection path uses and that is not currently allocated for non-protection paths.

22. The method according to claim 19, wherein said link state advertising information comprises one or more type, length, value (TLV) objects flooded using a link state routing protocol, wherein said one or more TLVs optionally function as sub-TLVs of other TLVs.

23. The method according to claim 19, wherein said routing protocol is chosen from the group comprising the Open Shortest Path First (OSPF) protocol, OSPF extensions, OSPF-TE or OSPF-TE extensions.

24. The method according to claim 19, wherein said routing protocol comprises the Intermediate System to Intermediate System (ISIS) protocol or any extensions thereof.

25. The method according to claim 19, wherein said routing protocol comprises the Private Network to Network Interface (PNNI) protocol or any extensions thereof.

26. The method according to claim 19, wherein said link state information relating to the bandwidth available on a particular link is apportioned in accordance with a plurality of classes for the available bandwidth of said protection paths, a plurality of classes for the available bandwidth of said protected paths and a plurality of classes for the available bandwidth of said unprotected paths.

27. The method according to claim 19, wherein said link state information relating to the bandwidth available on a particular link comprises a first TLV adapted to indicate bandwidth available for protected-LSPs, a second TLV adapted to indicate bandwidth available for unprotected-LSPs and a third TLV adapted to indicate total available bandwidth.

28. The method according to claim 19, wherein said link state information relating to the bandwidth available on a particular link comprises a first TLV adapted to indicate bandwidth available for protected-LSPs for a plurality of classes, a second TLV adapted to indicate bandwidth available for unprotected-LSPs for a plurality of classes and a third TLV adapted to indicate total available bandwidth for a plurality of classes.

29. The method according to claim 19, wherein said first search, said second search and said third searches are is performed utilizing the Dijkstra algorithm.

30. The method according to claim 19, wherein said the configuration of nodes within said network utilizes Reservation Protocol (RSVP) signaling, RSVP-TE or any extensions thereof.

31. The method according to claim 19, wherein said the configuration of nodes within said network utilizes LDP signaling, CR-LDP or any extensions thereof.

32. The method according to claim 19, wherein said step of configuring nodes within said network comprises configuring the Multiprotocol Label Switching (MPLS) forwarding within the nodes.

33. The method according to claim 19, further comprising the steps of recalculating and re-advertising the available bandwidth for protection paths, protected paths and unprotected paths in response to changes in network topology.

34. The method according to claim 19, further comprising the steps of recalculating and re-advertising the available bandwidth for protection paths, protected paths and unprotected paths in response to changes in the link state of said network.

35. A method of routing protected Label Switched Paths (LSPs) in a network, said method comprising the steps of:
receiving link state advertising information generated by nodes within said network, said link state advertising information utilized to derive available bandwidth on a particular link for protection paths, protected paths and unprotected paths;
performing a first search for a path using only links having sufficient available bandwidth for protected paths to accommodate said path; if said first search is not successful then, performing a second search for a path using only links having sufficient combined available bandwidth for protected paths and unprotected paths to accommodate said path; and if said second search is not successful then, performing a third search for a path using only links having sufficient combined available bandwidth for protection paths, protected paths and unprotected paths to accommodate said path.

36. The method according to claim 35, further comprising the step of configuring appropriate nodes within said network in accordance with the path found.

37. The method according to claim 35, wherein the bandwidth available reserved for protection paths represents the bandwidth of a link that is saved for protection path uses and that is not currently allocated for non-protection paths.

38. The method according to claim 35, wherein said link state advertising information comprises one or more type, length, value (TLV) objects flooded using a link state routing protocol, wherein said one or more TLVs optionally function as sub-TLVs of other TLVs.

39. The method according to claim 35, wherein said routing protocol comprises the Open Shortest Path First (OSPF) protocol, OSPF extensions, OSPF-TE or OSPF-TE extensions.

40. The method according to claim 35, wherein said routing protocol comprises the Intermediate System to Intermediate System (ISIS) protocol or any extensions thereof.

41. The method according to claim 35, wherein said routing protocol comprises the Private Network to Network Interface (PNNI) protocol or any extensions thereof.

42. The method according to claim 35, wherein said link state information relating to the bandwidth available on a particular link is apportioned in accordance with a plurality of classes for the available bandwidth of said protection paths, a plurality of classes for the available bandwidth of said protected paths and a plurality of classes for the available bandwidth of said unprotected paths.

43. The method according to claim 35, wherein said link state information relating to the bandwidth available on a particular link comprises a first TLV adapted to indicate bandwidth available for protected-LSPs, a second TLV adapted to indicate bandwidth available for unprotected-LSPs and a third TLV adapted to indicate total available bandwidth.

44. The method according to claim 35, wherein said link state information relating to the bandwidth available on a particular link comprises a first TLV adapted to indicate bandwidth available for protected-LSPs for a plurality of classes, a second TLV adapted to indicate bandwidth available for unprotected-LSPs for a plurality of classes and a third TLV adapted to indicate total available bandwidth for a plurality of classes.

45. The method according to claim 35, wherein said first search, said second search and said third searches are is performed utilizing the Dijkstra algorithm.

46. The method according to claim 35, wherein said the configuration of nodes within said network utilizes Reservation Protocol (RSVP) signaling, RSVP-TE or any extensions thereof.

47. The method according to claim 35, wherein said the configuration of nodes within said network utilizes LDP signaling, CR-LDP or any extensions thereof.

48. The method according to claim 35, wherein said step of configuring nodes within said network comprises configuring the Multiprotocol Label Switching (MPLS) forwarding within the nodes.

49. The method according to claim 35, further comprising the steps of re-calculating and re-advertising the available bandwidth for protection paths, protected paths and unprotected paths in response to changes in network topology.

50. The method according to claim 35, further comprising the steps of recalculating and re-advertising the available bandwidth for protection paths, protected paths and unprotected paths in response to changes in the link state of said network.

51. A network device, comprising:
one or more line PHY line interfaces for interfacing said network device to one or more communication links;
a switch adapted to switch data between a plurality of ingress inputs and a plurality of egress outputs;
a processor;
memory means coupled to said processor;
software means operative on said processor for:
receiving link state advertising information generated by nodes within said network, said link state advertising information utilized to derive available bandwidth on a particular link for protection paths, protected paths and unprotected paths;
performing a first search for a path using only links having sufficient bandwidth available of a first type the same as that of the path to be found to accommodate said path; if said first search is not successful then,
performing a second search for a path using only links having sufficient combined available bandwidth of a second type opposite of that of the path to be found to accommodate said path; and if said second search is not successful then,
performing a third search for a path using only links having sufficient protection path bandwidth available to accommodate said path.

52. A computer program product for use in a network device, said computer program product comprising:
a computer useable medium having computer readable program code means embodied in said medium for performing a path reroute in a network, said computer program product comprising:
computer readable program code means for advertising link state information utilized to derive the available bandwidth on a particular link for protection paths, protected paths and unprotected paths;
computer readable program code means for performing a first search for a path using only links having sufficient bandwidth available of a type the same as that of the path to be found to accommodate said path;
computer readable program code means for performing a second search, if said first search is not successful, for a path using only links having sufficient combined bandwidth available reserved for protected paths and unprotected paths to accommodate said path; and
computer readable program code means for performing a third search, if said second search is not successful, for a path using only links having sufficient combined bandwidth available reserved for protection paths, protected paths and unprotected paths to accommodate said path.

53. The method according to claim 52, further comprising computer readable program code means for configuring appropriate nodes within said network in accordance with the path found.

54. The method according to claim 52, wherein said first search, said second search and said third search employ the Dijkstra algorithm.

* * * * *